US006660999B2

(12) United States Patent
Bemish

(10) Patent No.: US 6,660,999 B2
(45) Date of Patent: Dec. 9, 2003

(54) HELIUM DROPLET MASS SPECTROMETRY (HDMS)

(75) Inventor: Raymond J. Bemish, Stonington, CT (US)

(73) Assignee: Pfizer Inc., New York, NY (US)

( * ) Notice: Subject to any disclaimer, the term of this patent is extended or adjusted under 35 U.S.C. 154(b) by 6 days.

(21) Appl. No.: 09/965,900

(22) Filed: Sep. 28, 2001

(65) Prior Publication Data

US 2002/0040966 A1 Apr. 11, 2002

Related U.S. Application Data

(60) Provisional application No. 60/239,512, filed on Oct. 11, 2000.

(51) Int. Cl.[7] .................... B01D 59/44

(52) U.S. Cl. .................... 250/282; 250/288

(58) Field of Search .................... 250/282, 288, 250/424

(56) References Cited

U.S. PATENT DOCUMENTS 5,397,901 A * 3/1995 Lo .................... 250/424
6,188,066 B1 * 2/2001 Whitehouse et al. ....... 250/288

* cited by examiner

*Primary Examiner*—John R. Lee
*Assistant Examiner*—Phillip A Johnston
(74) *Attorney, Agent, or Firm*—P. C. Richardson; P. H. Ginsburg; I. Nissenbaum

(57) ABSTRACT

A method and device for mass spectrometry analysis, wherein a mass spectrometer is adapted for use with helium droplets, as an ionization site medium, with a proton being initially captured by a large helium droplet (~10,000 helium atoms) and then cooled evaporatively to 0.4 Kelvin. The protonated helium droplet then picks up a neutral molecule of interest and the neutral molecule is protonated inside of the droplet with the liquid helium droplet acting as a heat bath to provide rapid cooling of the newly formed protonated molecule. As a result, there is essentially no energy available, at 0.4 Kelvin, for the protonated molecule to fragment. Remaining liquid helium is removed and the stably maintained protonated molecule is detected by a mass spectrometer. Since the molecules do not fragment when protonated (ionized), each compound in a mixture analyses gives one mass and the number of ions of a particular mass detected is directly proportional to the molar percentage of that mass in the sample. The device for effecting the method, comprises the elements of: (1) Helium cluster or droplet source; (2) Proton source for introduction of protons to the droplet (i.e., ionization); (3) atmospheric pressure (AP) Source for reduction of pressure to form a low pressure stream; (4) Cell pick-up elements where compound molecules are protonated or ionized at low temperature; (5) Desolvation area for removal of residual helium; and (6) Mass spectrometer and detector.

11 Claims, 3 Drawing Sheets

Figure 1:
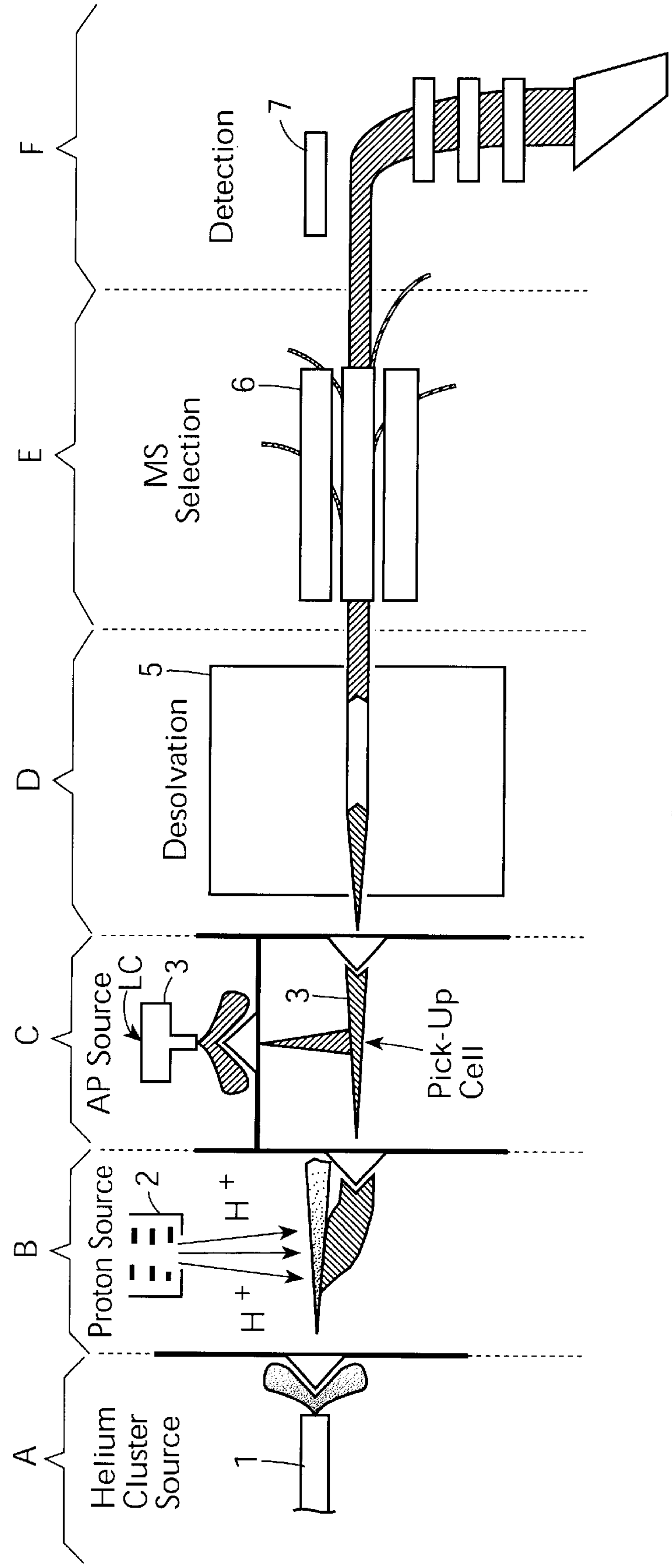

50,000 He atoms $H^+(1eV)+He_n \rightarrow He_nH^+$
2.54 eV
47460 He atoms $C_{60}(298K) \rightarrow C_{60}\ (0.3K)$
1.6 eV
45860 He atoms $He_nH^+ + C_{60} \rightarrow C_{60}H^+ + He_n$
7.05 eV
38810 He atoms

HELIUM DROPLET MASS SPECTROMETRY (HDMS)

This application is a Non Provisional of Provisional Application No. 60/239,512 filed Oct. 11, 2000.

FIELD OF THE INVENTION

This invention relates to mass spectrometry analysis, and methods and devices for increasing throughput and enhancing the quality of results obtained thereby and particularly relates to the precursor ionization, especially protonation, of subject compounds for analysis.

BACKGROUND OF THE INVENTION

In basic mass spectrometry, a molecule is bombarded with an electron beam with sufficient energy to fragment it. The positive fragments which are produced (cations and radical cations) are accelerated in a vacuum through a magnetic field and are sorted on the basis of mass-to-charge ratio. Since the bulk of the ions produced in the mass spectrometer carry a unit positive charge, the value m/e is equivalent to the molecular weight of the fragment. The analysis of mass spectroscopy information involves the re-assembling of fragments, working backwards to generate the original molecule. Since the very process of ionizing the molecule causes the molecule to fragment, it has not been possible to directly generate the original molecule without fragment assembly.

In operation, a very low concentration of sample molecules is allowed to leak into the high vacuum ionization chamber where they are bombarded by a high-energy electron beam. The molecules fragment and the positive ions produced are accelerated through a charged array into an analyzing tube. The path of the charged molecules is bent by an applied magnetic field. Ions having low mass (low momentum) are deflected and collide with the walls of the analyzer and high momentum ions are not deflected enough and also collide with the analyzer wall. Ions having the proper mass-to-charge ratio, however, follow the path of the analyzer, exit through the slit and collide with the Collector to generate an electric current, which is amplified and detected. By varying the strength of the magnetic field, the mass-to-charge ratio which is analyzed can be continuously varied.

The output of the mass spectrometer shows a plot of relative intensity vs the mass-to-charge ratio (m/e), with the most intense peak in the spectrum being designated the base peak and all others are relative thereto in intensity. The peaks themselves are usually represented as vertical lines.

Fragmentation is predictable and the ions which are formed reflect the most stable cations and radical cations that the molecule can form. The highest molecular weight peak observed in a spectrum typically represents the parent molecule, minus an electron, and is referred to as the molecular ion (M+). Fragments can be identified by their mass-to-charge ratio, or, more preferably by the mass which has been lost.

A common mass spectroscopy method utilized with identifying compounds and molecule characteristics, especially in drug screening applications, is HPLC (High Performance Liquid Chromatography) with the mass spectrometer being utilized as a detector after a choromatographic separation. In such method, samples are injected onto a reversed-phase HPLC column and eluted with a solvent into the source of an electrospray ionization/ion trap mass spectrometer. The source converts the liquid effluent into an aerosol and ionizes the solutes in the aerosol. Desolvated ions are drawn into the analyzer of the mass spectrometer and are collected in a trap. Once the trap is filled, its voltages are varied so ions leave in an orderly, mass-dependent manner and strike a detector. By calibrating the process with ions of known mass, the unknown masses of samples can be measured (LC/MS).

In addition, specific ions can be isolated from other ions in the trap and fragmented by collision-induced dissociation, and the masses of the fragments can be measured (LC/MS/MS). For example, for a peptide, most fragmentations will occur at peptide bonds, and so the fragmentation patterns contain information about the peptide's sequence, which can be used to identify proteins.

While LC/MS is a valuable analysis tool there are certain deficiencies. Thus, for example, LC/MS does not always produce the parent ion, and this may accordingly necessitate an undue effort to assign a molecular structure. In addition, standards are required to give a percent composition (molar). Also chromatographic separation is needed before mass analysis. Finally, there is difficulty in providing a wide encompassing range of ionization, from small solvent molecules to large proteins.

It is highly desirable, but often difficult, to provide for quick screen pilot reactions, not only to determine if the desired product is present, but also to determine the amount produced. In areas where high throughput screening is being used, speeding up the assays can be effected by removing the need to perform separations which are a mainstay of LC/MS. Additionally, for analyzing drug substances and drug products, impurities should be much easier to identify and further quantitation of impurities should be performed without the need for standards.

SUMMARY OF THE INVENTION

To be useful, any new method of ionization has to overcome the two following seemingly fundamental limitations:

(1) The ability of a molecule to pick up a charge either in solution or from a plasma is dependent on the proton affinity (PA) of the neutral molecule compared to the proton affinity of the solvent or gas. In other words, if a molecule does not have a high PA, it will not pick up a charge and will not be detected. This leads to different levels of response for different molecules and inconsistencies in measurements.

(2) The amount of energy deposited during the ionization and from collisions with neutral gas molecules raises the chance of fragmentation with concomitant increase in difficulty in reconstructing the molecule and determination of the parent molecule.

The primary cause of these limitations is that ions being created exist temporarily in a high pressure environment. As a result, there are collisions that lead to heating and the opportunity for charge exchange or ion molecule reactions. While it may be considered possible to obviate this problem by performing the ionization at low pressure, to limit the number of collisions with other gas molecules, the addition or removal of a proton (Chemical Ionization) or the removal of an electron (Electron Impact Ionization) is sufficiently exothermic, in itself, so as to cause covalent bonds to dissociate and in a high pressure ionization source, collisions with neutral gasses allow the energy to be removed from the ions before they can fragment. There is thus no ideal pressure for ionization without charge exchange or ion molecule reactions.

It is therefore an object of the present invention to provide a method and device for molecule ionization for analysis of the molecule such as with mass spectroscopy but with minimized or without charge exchange or ion molecule reaction.

It is yet another object of the present invention to provide a means to enhance consistency between measurements of different molecules with mass spectrometers.

It is still yet another object of the present invention to provide such means whereby molecules do not fragment with ionization or collision.

Generally the present invention comprises a method and device for effecting said method, for analyzing full molecules by mass spectroscopy without fragmentation of the molecules normally resulting from ionization or collisions. In accordance with the present invention, molecules are ionized in a sufficiently cold environment wherein fragmentation collisions are minimized and wherein heat transfer means such as a heat bath remove heat generated by the ionization prior to fragmentation of the molecule thereby.

In a very highly preferred embodiment of the present invention droplets of liquid helium, cooled to just above absolute zero, are used as an environment for ionization. A liquid helium droplet provides the molecule with a collision-free environment and at the same time provides a highly efficient method for removing the internal energy generated during ionization.

A device (Helium Droplet Mass Spectrometer—HDMS), used in accordance with the method of the present invention comprises the elements of:

a) helium droplet or cluster source for production of near absolute zero temperature droplets of helium;

b) proton source for supply of ions to protonate a molecule to permit mass spectrometer analysis;

c) atmospheric pressure (AP) source for protonation or ionization of the molecule;

d) means for desolvation or removal of excess liquid helium; and e) analysis means such as a mass spectrometer with selection means and detection means for analysis and detection of the full protonated molecules, or selection means and detection means for measurement of the accurate mass, or selection means and detection means for providing controlled fragmentation of the full protonated molecule for structural analysis.

These and other objects, features and advantages of the present invention will become more evident from the following discussion and drawings in which:

SHORT DESCRIPTION OF THE DRAWINGS

FIGS. 1*a–f* schematically depict the steps of the method of the present invention and site elements for effecting such steps;

FIGS. 2*a–e* depict the sites of helium droplet or cluster source, proton source, AP source, desolvation and mass spectrometer with detector, respectively; and FIGS. 3*a–d* depict the heat bath characteristics of liquid helium relative to a Buckminster fullerene molecule ($C_{60}$).

DETAILED DESCRIPTION OF THE INVENTION, THE PREFERRED EMBODIMENTS AND THE DRAWINGS

The advantage of ionizing a molecule in the isolation of a near absolute zero helium droplet in accordance with the present invention is that the molecule will not fragment. This means that there will be only one peak for each mass in the sample. In the case of LC-MS, this means that there would be no need for separating components by LC, as long as none of the components have the same masses (i.e. isomers). This greatly speeds up analysis since traditionally a considerable amount of time is simply waiting for the components to separate on a column before entering the mass spectrometer.

The lack of competition during ionization means that all molecules (except helium) will ionize with similar efficiency, therefore, the intensity measured for a given mass is directly related to its molar percent in the sample. This eliminates the need to produce reference materials and standards to determine the various response factors.

The method and device of the present invention offers several significant advantages over current analytical technology, namely by giving the percent composition (molar) without the need for standards and by obviating the need for chromatographic separation before mass analysis.

The Apparatus:

The HDMS of the present invention, as depicted in FIGS. 1*a–f,* preferably contains 6 functional units:

(1) Helium cluster source 1

(2) Proton source 2

(3) AP Source 3

(4) Pick-up Cell site 4

(5) Desolvation Area 5 and (6) Mass spectrometer and detector 6 and 7 respectively.

Figure 2A:
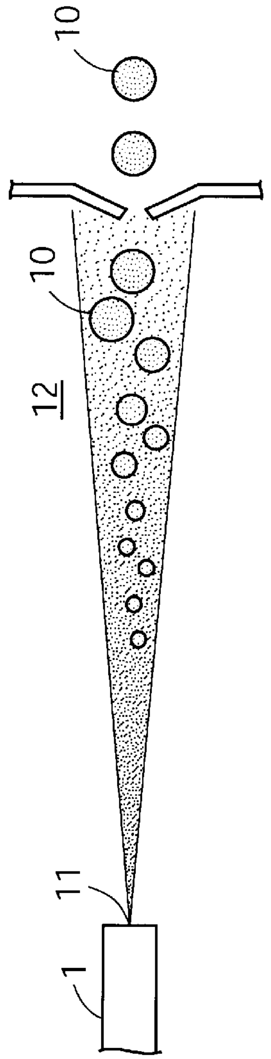

The sites are more specifically shown in FIGS. 2*a–e* with the following describing the operative steps at each of the respective sites:

Helium Cluster Source 1:

As shown in more detail in FIG. 2*a*, ultra pure helium is expanded under pressure through a 5 μm nozzle 11 into a vacuum chamber 12 at $10^{-5}$ torr of pressure. As the helium expands, it cools, homogeneously nucleates, and forms droplets or clusters 10 containing at least about 10,000 and preferably between about 100,000 to 1,000,000 helium atoms. The temperature of the droplets or clusters is initially the same as the nozzle (cooled by a cryopump) of less than 20° K. The liquid helium droplets cool via evaporation until they reach a temperature of 0.37° K. At this temperature, there is no longer enough internal energy in the helium droplets to overcome the surface tension and evaporate even a single helium atom. By the time the helium droplet 10 leaves the chamber 12, it has between 50,000 and 500,000 helium atoms. The technique for forming this type of helium beam is, for example, described by K. Nauta and R. E. Miller, in J. Chem. Phys., 111, 3426 (1999). The cooling capacity of the helium droplets is related to the number of helium atoms. For every 1,000 helium atoms in a droplet, there is approximately 1 eV of cooling capacity (23 kcal/mole or 8055 $cm^{-1}$).

Figure 2B:
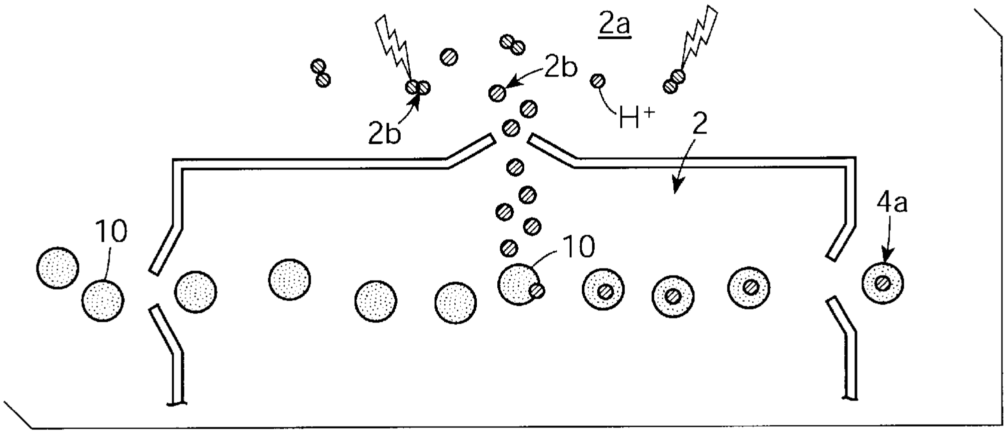

Protonation Region 2:

As depicted in FIG. 2*b*, the helium droplets 10 pass through a skimmer into the protonation region 2. In a separate chamber 2*a*, a 500 Watt, 2.45 GHz microwave source is used to autoionize hydrogen ($H_2$) into $H^+$. This known process produces a continuous current 2*b* of protons of about 100 mA. The protons are extracted from this high pressure region (1–100 mtorr) through a skimmer. After decelerating the protons to about 1 eV of kinetic energy, the proton beam crosses the beam of liquid helium droplets 10. When a proton collides with a helium droplet, it is quickly absorbed. The amount of energy released in the solvation of a proton is the sum of the kinetic energy of the proton (~1 eV) and the heat of formation of $HeH^+$ (1.54 eV). The 2.54 eV of energy deposited in the helium droplet is dissipated by the evaporation of 2540 helium atoms. A 100 mA current of protons doses the helium cluster beam with an efficiency of approximately 1 proton per helium droplet.

Figure 2C:
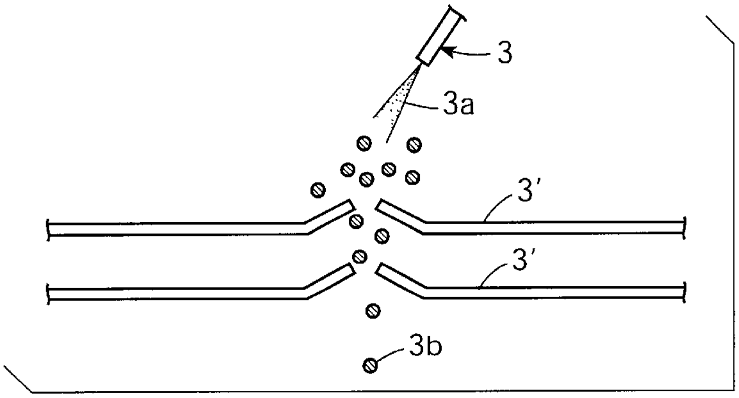

AP Source 3:

As shown in FIG. 2*c*, a portion 3*a* of the effluent of an HPLC, in the AP source 3, is nebulized in a stream of helium and carried as a gas through a series of skimmers 3'. The skimmers reduce the pressure from atmospheric pressure (760 torr) to less than $10^{-3}$ torr and preferably $10^{-5}$ torr (or about 10 ppb of the initial stream.) As the stream of neutral effluent molecules 3*b* passes through the skimmers, it enters the Pick-up Cell 4.

Figure 2D:
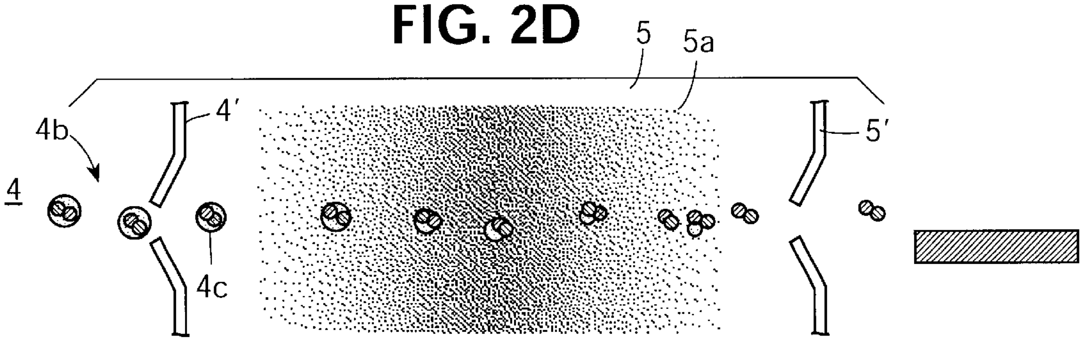

Pick-up Cell 4:

In FIG. 2*d,* the stream of neutral effluent molecules 3*b* leaving the AP Source 3, forms a beam 4*b* that crosses the beam of protonated helium droplets 4*a*. The protonated helium droplets sweep out a large path capturing neutral molecules. At the background pressure of $10^{-5}$ torr, the helium droplets pick up on average 1 neutral molecule per droplet. When a neutral molecule is absorbed, helium evaporates from the droplet to dissipate the heat of solvation and the internal energy of the neutral molecule.

As an example of molecule size and heat dissipation as required in the present invention, as compared to specific molecules, a worst case example, Buckminster fullerene ($C_{60}$), is depicted in series in FIGS. 3*a–d*. with an anomalously high heat capacity of 0.131 kcal $mol^{-1}$ $K^{-1}$ (1.66 eV of internal energy at 298 Kelvin) which dissipates 1660 helium atoms when captured. Since the neutral molecule has a substantially higher polarizability than helium it is attracted to the proton. When the neutral molecule and the proton form a complex, the energy released results in helium boiling off the droplet. For forming $C_{60}H^+$, the amount of energy dissipated is equal to the difference in proton affinity between helium and $C_{60}$. The proton affinity of $C_{60}$ is 198 kcal/mole and the proton affinity for helium is 35.5 kcal/mole. The difference is 162.5 kcal/mole, which translates to 7.05 eV or 7050 helium atoms. At this point, even with the large molecule, the total helium evaporated is only 11,190 atoms from an initial of 50,000 to 500,000 atoms or, at most, only a 23% loss of helium atoms as continued coolant.

In accordance with the present invention, there should be at least a few helium atoms left after the protonation, to insure that the complex remains at 0.37° K. By analyzing the example above, it is possible to estimate the largest molecule that can be effectively ionized in accordance with the present invention. The difference between the proton affinities of helium and most other neutral molecules rarely exceeds 10 eV and the kinetic energy of the proton is 1 eV. For a helium droplet of 50,000 atoms, the heat capacity remaining in the droplet is then 39 eV. If it is assumed that the heat capacity of the neutral molecule scales roughly with the molecular weight (0.0023 eV/Dalton), then the remaining 39 eV is able to cool a molecule with a mass of 16.9 kDa. This is however only with respect to the smallest droplet. If larger droplets are produced, such as by further cooling the source, molecules over 200 kDa can be effectively ionized, with application to use with biological analysis applications ranging from DNA to proteins and antibodies.

Desolvation cell 5:

In FIG. 2*d,* after passing through the skimmer 4' at the end of the pick-up cell 4, the helium droplet beam 4*c* passes into the desolvation cell 5 for removal of helium from the protonated species. This is accomplished by collisions with a cloud of cold helium ($10^{-3}$ torr) 5*a*. Since the droplet is moving at a relatively slow velocity, the collisions with the background helium will not however introduce significant internal energy, whereby the metastable ion remains intact until detection.

Figure 2E:
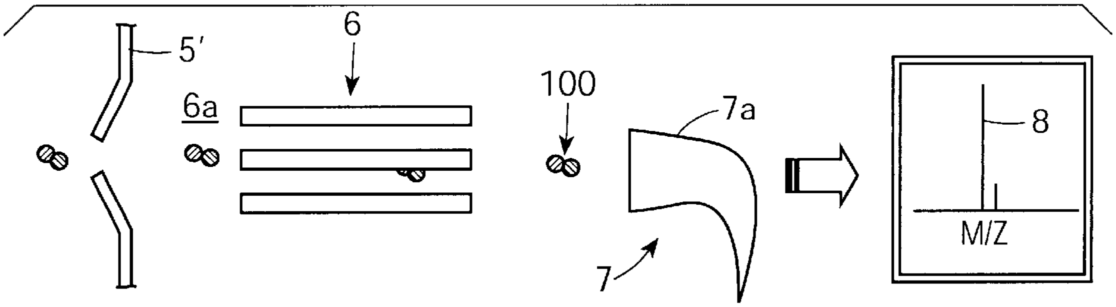
Figure 3A:
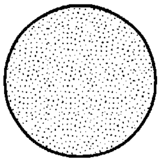
Figure 3B:
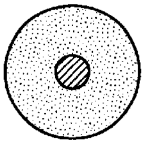
Figure 3C:
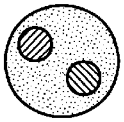
Figure 3D:

Mass Spectrometer 6/Detector 7:

In FIG. 2*e,* after passing through a skimmer 5', into the ultra high vacuum region 6*a* ($10^{-7}$ torr) of the mass spectrometer 6, the protonated molecular ion 100 is detected by a quadrupole detector 7*a* with a resultant single molecule peak 8.

It is understood that the above description and the embodiment depicted in the drawings is merely exemplary of the present invention and that changes and modification such as to structure, steps and materials may be made without departing from the scope of the present invention as defined in the following claims. Thus, for example, an alternative detection method would utilize a Quadrupole Time of Flight Mass spectrometer (QTOF) or a Fourier Transform Ion Cyclotron Resonance Mass Spectrometer (FTICR-MS) to measure accurate mass of the protonate molecule to yield its stoichiometry. A mass spectrometer may also be used to provide an environment for controlled fragmentation to aid in determining the chemical structure of the full protonated molecule.

What is claimed is:

1. A method for ionizing a molecule comprising the steps of:

a) preparing a fluid medium for containing the molecule during said ionization at a temperature above absolute zero but below a temperature at which said molecule would fragment, as a result of said ionization or as a result of collision between molecules and wherein said fluid medium is of sufficient volume to function as a heat bath to maintain a temperature below said fragmentation temperature;

b) introducing the molecule and an ionization ion into said fluid medium whereby said molecule is ionized therein and wherein a temperature below said fragmentation temperature is maintained;

c) removing the fluid medium without fragmentation of the ionized molecule.

2. The method of claim 1, wherein said fluid medium is liquid helium at a temperature below 1° K.

3. The method of claim 2, wherein said ionization ion is a proton.

4. The method of claim 3, wherein said liquid medium comprises a droplet initially containing at least 10,000 helium atoms.

5. The method of claim 1, wherein said ionized molecule is subsequently used in mass spectroscopy analysis.

6. The method of claim 4, comprising the steps of:

(a) forming a helium cluster containing at least 10,000 helium atoms and reducing the temperature thereof to 0.4° K;

(b) introducing a proton into said cluster;

(c) reducing the ambient pressure at which said molecule is maintained from atmospheric pressure to less than $10^{-3}$ torr;

(d) introducing the molecule into the protonated helium cluster whereby the molecule is protonated;

(e) removing the helium from the droplet to provide a residual non-fragmented protonated molecule; and (f introducing the non-fragmented molecule into a mass spectrometer and detector for analysis.

7. The method of claim 6, wherein said analysis comprises accurate mass measurement.

8. The method of claim 6, wherein said analysis comprises controlled fragmentation and detection.

9. A device for protonating a molecule without the fragmentation thereof in accordance with claim 6, comprising:

(a) means for forming a helium cluster of at least 10,000 helium atoms and means for the cooling thereof to 0.4° K;

(b) means for forming protons and means for the introduction of a proton to said helium cluster;

(c) means for reducing the ambient pressure at which said molecule is maintained from atmospheric pressure to $10^{-3}$ torr;

d) means for introducing the molecule into the protonated helium cluster whereby the molecule is protonated;

(e) means for removing the helium from the droplet to provide a residual non-fragmented protonated molecule; and (f) means for introducing the non-fragmented molecule into a mass spectrometer and detector for analysis.

10. The device of claim 9, wherein said analysis comprises accurate mass measurement.

11. The device of claim 9, wherein said analysis comprises controlled fragmentation and detection.

* * * * *